United States Patent [19]

Khera

[11] 4,275,458
[45] Jun. 23, 1981

[54] INTERRUPT EXPANDER CIRCUIT

[75] Inventor: M. Ibrahim Khera, Glendale, Ariz.

[73] Assignee: GTE Automatic Electric Laboratories Incorporated, Northlake, Ill.

[21] Appl. No.: 103,756

[22] Filed: Dec. 14, 1979

[51] Int. Cl.³ .......................... G06F 9/46; G06F 3/00
[52] U.S. Cl. .................................................. 364/900
[58] Field of Search ... 364/200 MS File, 900 MS File

[56] References Cited
U.S. PATENT DOCUMENTS

| | | | |
|---|---|---|---|
| 3,597,743 | 8/1971 | Murphy | 364/200 |
| 4,035,780 | 7/1977 | Kristick et al. | 364/900 |
| 4,078,259 | 3/1978 | Soulsby et al. | 364/900 |
| 4,093,998 | 6/1978 | Miller | 364/900 |

Primary Examiner—Joseph M. Thesz
Assistant Examiner—Eddie P. Chan
Attorney, Agent, or Firm—Robert J. Black; Frank J. Bogacz

[57] ABSTRACT

An interrupt expander circuit provides for greatly enlarging the capacity of vectored interrupts in a microprocessor system. This circuit provides the capability for a very large number of peripheral devices to be connected to a microprocessor centeral processing unit via an interrupt structure while maintaining the same interface requirements between the interrupting peripheral devices and the microprocessor. This circuit provides a priority interrupt structure.

9 Claims, 2 Drawing Figures

INTERRUPT EXPANDER CIRCUIT

BACKGROUND OF THE INVENTION

(1) Field of the Invention

The present invention pertains to microprocessor controlled computer systems and more particularly to a scheme for interconnecting a large number of peripheral devices to a microprocessor via an interrupt structure.

(2) Description of the Prior Art

In computer control systems it is required that peripheral devices be connected to the central processing unit. Such peripheral devices may comprise keyboards, display devices, teletypewriters, CRT's and various sensors. In operation, these peripheral devices perform a great number of events external to the processing of the central processing unit. These devices must continually receive instructions from the processing unit in order to perform their respective functions.

In order for a central processor to monitor the operation of the peripheral devices a number of sensors are provided which connect the peripheral to the processor. Such sensors describe the present operation of the peripheral device. For example, one sensor may indicate that a data character has been received by a teletypewriter and another sensor may indicate that a teletypewriter is ready to transmit another character to be printed. Still other sensors may indicate various error conditions which a peripheral device may encounter.

One method that a central processing unit may employ to monitor the operation of peripheral devices is called scanning or polling. In this method, the operating program of the central processing unit scans the sensors to determine whether any sensor indicates a state change. For example, a sensor may make a state transition from a logic "0" to a logic "1" indicates that a data character has been received by a teletypewriter or it may indicate some malfunction occurring within the teletypewriter. A sizable portion of such an operating program must scan all such sensors continually at a fixed rate to determine whether any state changes of the sensors have occurred. When a state change is detected subsequent portions of the operating program may be given control to monitor or perform a particular function in response to the state change.

As the number of sensors to be scanned increases, the processor's operating program must spend a great deal of its time interrogating the status of the sensors, although statistically, only a small percentage of the sensors will change state for a given scan cycle. For systems with a large number of sensors such a scheme is inefficient. Therefore, a scheme which would call the operating program only for those occasions upon which a state change of a sensor is detected is highly desirable.

A method of informing the operating program only when a state change occurs is called an interrupt. Thus, the operating program may perform other tasks than simply scanning all the sensors. Thereby the operating program is forced to stop these other tasks only when an interrupt caused by a state change of a sensor occurs. Modern microprocessor technology provides central processing units with an interrupt capability. However, due to packaging limitations only a single interrupt facility is provided by such microprocessors. Typically, such microprocessors include of models 8080, 8085 and 8086 manufactured by the Intel Corporation.

Therefore, the Intel Corporation has provided a Programmable Interrupt Controller device model 8259 which provides for interfacing up to 8 priority interrupts to a microprocessor with a single interrupt capability. This scheme can accommodate up to 8 interrupting sensors. However, a moderate size microprocessor control system may easily require more then 8 interrupting sensors. In order to solve this problem the programmable interrupt controllers have been constructed to be cascadable. In such a configuration, 8 programmable interrupt controllers are connected to a single programmable interrupt controller which is in turn connected to the microprocessor. Such a configuration can provide for up to 64 vector interrupts.

In process control systems, such as telephone processing systems, still larger numbers of interrupting sensors are required. Therefore, it is required that a greater number then 64 vector interrupts be provided in order to efficiently operate such process control systems.

Therefore, it is an object of the present invention to provide a simple, quickly responsive circuit which greatly expands the number of priority vector interrupts to a microprocessor with a single interrupt capability.

It is also an object of the present invention to provide the above mentioned object while providing for the resolution of timing conflicts for multiple simultaneous interrupts.

SUMMARY OF THE INVENTION

The present invention comprises an interrupt expander circuit for use in a microprocessor system the microprocessor system includes a microprocessor central processing unit having a single interrupt capability. The microprocessor system also includes first and second pluralities of interrupt sources each of the interrupt sources may generate an interrupt request signal upon the occurrence of an external event. Each of the interrupt sources is connected to a particular one of a first or second plurality of interrupt controllers, each interrupt controller generates an interrupt request signal in response to receiving an interrupt request signal from an interrupt source. A first interrupt controller is connected between the first plurality of interrupt controllers and the interrupt expander circuit. Similarly, a second interrupt controller is connected between the second plurality of interrupt controllers and the interrupt expander circuit. The first and second interrupt controllers generate interrupt request signals in response to receipt of an interrupt request signal from one of its associated plurality of interrupt controllers.

The interrupt expander circuit comprises a clock circuit which generates a relatively high frequency series of pulses. In addition, first latching means of the expander circuit is connected between the first interrupt controller and the microprocessor and is further connected to the clock circuit. Second latching means of the expander circuit is connected between the second interrupt controller and the microprocessor and is also connected to the clock circuit. First gating means of the expander circuit is connected between the first and second latching means. Similarly, second gating means is connected between the first and the second latching means.

When an interrupt request signal is generated by an interrupt source, the signal is transmitted through the appropriate one of the plurality of interrupt controllers to which it is connected. This signal is then transmitted to the interrupt controller corresponding to which the plurality of controllers is connected. Next, the signal is transmitted from the interrupt controller to the interrupt expander circuit where it is transmitted to its corresponding appropriate latching means. For example, if the interrupt request signal is transmitted to the first latching means and no other interrupt request signal is present in the second latching means, the first latching means transmits the interrupt request signal through to the microprocessor while simultaneously providing an inhibit of the second latching means' operation.

When the microprocessor acknowledges the interrupt request signal, the acknowledge signal is transmitted to the interrupt controller which initially received the interrupt request signal from the interrupt source. A control bus enables the interrupt acknowledge signal to be returned to the proper requesting interrupt controller.

When each of the first and second latching means of the interrupt expander circuit simultaneously receive an interrupt request signal, both latching means initiate operation and as a result the second gating means is initiated. Thereby, second gating means is operated to produce an inhibiting signal which prevents the second latching means from transmitting its interrupt request signal to the microprocessor. Then, the first latching means transmits its interrupt request signal to the microprocessor.

When the microprocessor responds to this request within interrupt acknowledge signal, the acknowledge signal is transmitted through the interrupt expander circuit along the supervisory signals to the particular interrupt controller which initiated the interrupt request signal corresponding to the interrupt source.

After the microprocessor has serviced the interrupt, the interrupt request signal is removed, this action removes the inhibit signal which permits the second latching means to transmit its interrupt request signal to the microprocessor while inhibiting the first latching means from transmitting another interrupt request signal. When the microprocessor acknowledges the interrupt request signal of the second latching means, an acknowledge signal is transmitted to the interrupt controller which initiated the interrupt request signal corresponding to the interrupt source. If another interrupt request signal was transmitted to the first latching means, it will be handled after the inhibit signal has been removed by the second latching means as described above. As a result, one of the latching means is prohibited from monopolizing the microprocessor interrupt by having a condition of successive interrupt request signals.

DESCRIPTION OF THE PREFERRED EMBODIMENT

Figure 1:
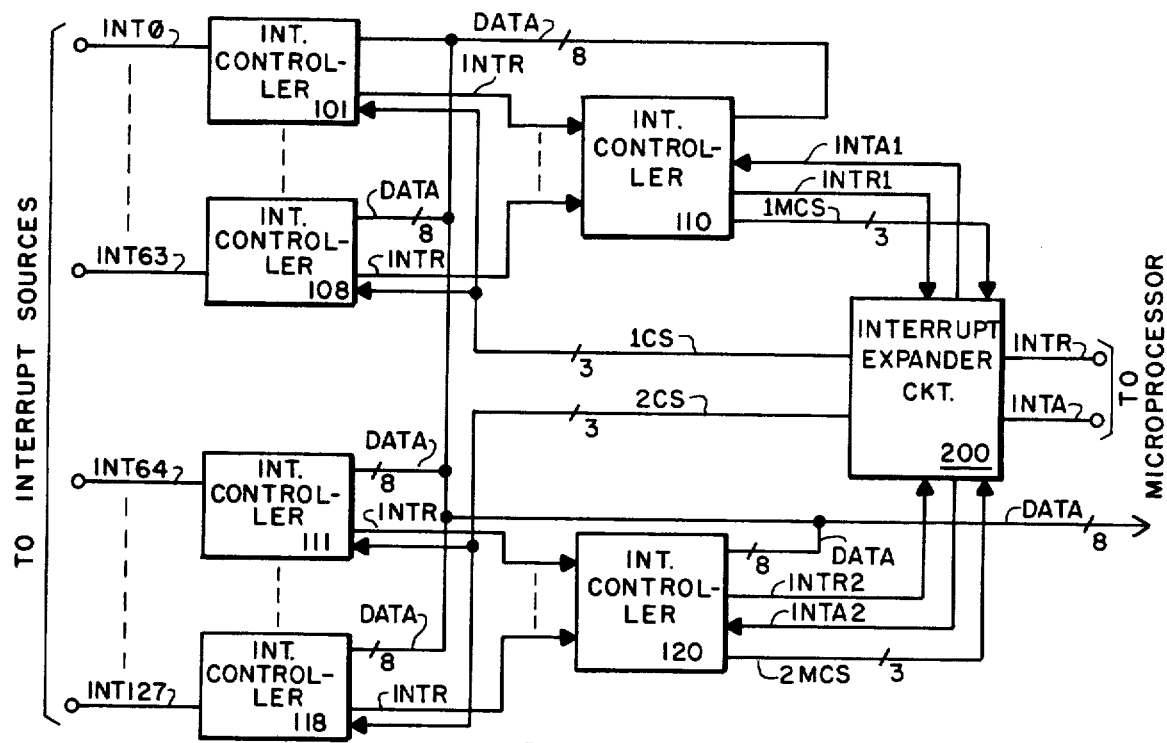
FIG. 1 is a schematic diagram of an expanded interrupt system for use in conjunction with a microprocessor system.

Referring to FIG. 1, an interrupt control system is shown connected between 128 interrupt sources and a microprocessor having a signal interrupt and acknowledge capability. Interrupt controllers 101 through 108 are shown connected to 64 interrupt sources INT0 through INT63. Each interrupt controller is connected to 8 interrupt sources; interrupt controller 101 is connected to interrupts INT0 through INT7, etc. Interrupt controllers 102 through 107 are not shown. Similarly, interrupt controllers 111 through 118 are connected to 64 interrupts INT64 through INT127. Interrupt controllers 112 through 117 are not shown.

Interrupt controller 110 is shown connected in cascade fashion between interrupt controllers 101 through 108 and the interrupt expander circuit 200. Similarly, interrupt controller 120 is shown connected in cascade fashion between interrupt controllers 111 through 118 and the interrupt expander circuit 200. Interrupt expander circuit 200 is connected to the microprocessor.

Interrupt controllers 101–108, 110, 111–118 and 120 may be implemented via an integrated circuit part number 8259 (programmable interrupt controller) manufactured by the Intel Corporation. A description of these integrated circuits may be found in a publication "MCS-85 User's Manual" copyright 1978.

This system operates to transmit a plurality of interrupts one at a time to a microprocessor for subsequent handling by the processor. For example, interrupt source INT0 signals an interrupt request to interrupt controller 101. Subsequentially, interrupt controller 101 determines which interrupt request signal is the highest priority and permits that interrupt signal to be transmitted to interrupt controller 110. Interrupt controllers 102 through 108 may similarly have interrupt request signals transmitted through them. Interrupt controller 110 than transmits its highest priority interrupt request signal via lead INTR1 to the interrupt expander circuit 200. Similarly, interrupt controllers 111 through 118 operate to transmit interrupt request signals from the interrupt sources INT64 through INT127 via these controllers to interrupt controller 120. Interrupt controller 120, similarly to interrupt controller 110, transmits interrupt request signal INTR2 to the interrupt expander circuit 200. Interrupt expander circuit 200 determines which interrupt is to be processed next and transmits that signal to the microprocessor via the INTR lead.

The microprocessor responds, in due course, with an interrupt acknowledge signal INTA transmitted to the interrupt expander circuit 200. Interrupt expander circuit 200 transmits this interrupt acknowledge signal through interrupt controller 110 or 120 to the particular interrupt controller which initiated the request. After the interrupt has been processed by the microprocessor, the interrupt source resets its associated interrupt request signal INT0 through INT127, thereby removing the interrupt request and allowing other interrupts to be processed. Additionally, the microprocessor must reset the internal controls of the associated interrupt controller.

All the interrupts which this system is able to generate are vectored interrupts. That is, the microprocessor can be forced to begin execution of its instructions at a particular address selectable by the interrupt controller. The interrupt controller accomplishes this by "jamming" the appropriate instruction on the data bus at the proper time.

The interrupt sources may comprise peripheral devices, such as CRT's, teletypewriters, magnetic tape devices, disc drives, etc. In the present instance, the microprocessor comprises an integrated circuit part number 8080 or 8085 manufactured by the Intel Corporation; and, the interrupt controllers comprise an integrated circuit part number 8259. However, the microprocessor may also comprise an integrated circuit part number 8086 manufactured by the Intel Corporation; and, an integrated circuit part number 8259A is required for use with this microprocessor and both are also manufactured by the Intel Corporation. Additionally, the integrated circuit 8259A may also be used with the 8080 and 8085 microprocessors.

Figure 2:
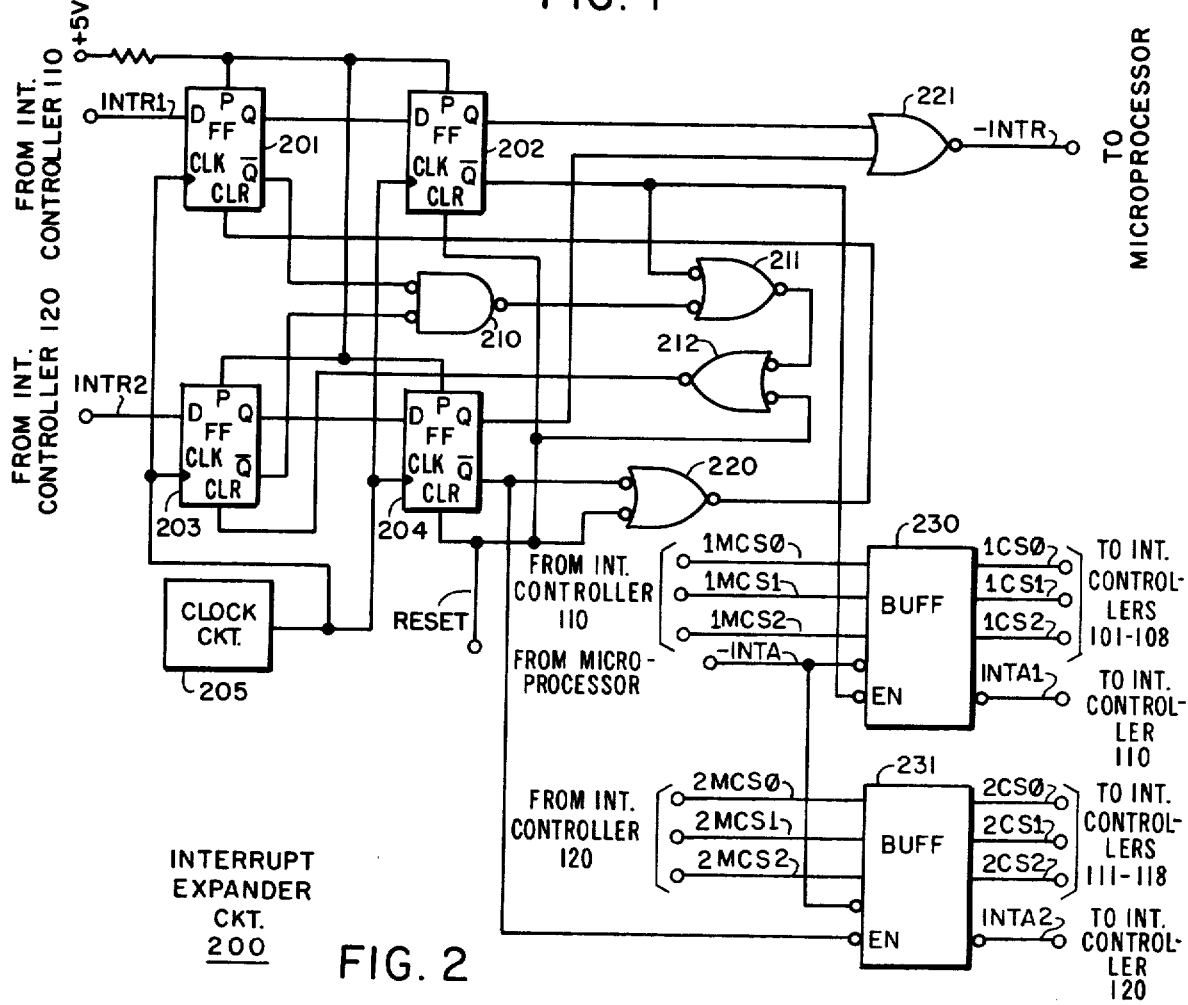
FIG. 2 is a schematic diagram embodying the principles of operation of an interrupt expander circuit for use in the expanded interrupt system.

Turning now to FIG. 2, the interrupt expander circuit of FIG. 1 is shown in detail. In the illustrated circuit, flip-flop 201 is connected between interrupt controller 110 of FIG. 1 and flip-flop 202. Further, flip-flop 203 is connected between interrupt controller 120 of FIG. 1 and flip-flop 204. NOR gate 221 is connected between each of flip-flops 202 and 204 and the microprocessor.

Clock circuit 205 is connected to each of the clock CLK inputs of flip-flops 201-204. OR gate 210 is connected between flip-flops 201 and 203 and AND gate 211. AND gate 211 is also connected to flip-flop 202. AND gate 212 is connected between AND gate 211 and flip-flop 203. AND gate 212 is further connected to the microprocessor via external reset line. AND gate 220 is connected between flip-flop 204 and flip-flop 201. Further, AND gate 220 is connected to the microprocessor by the reset lead.

Buffer 230 is connected between interrupt controller 110 shown in FIG. 1 and interrupt controllers 101 through 108 also shown in FIG. 1. In addition, buffer 230 is connected to flip-flop 202. Further, buffer 230 is connected between the microprocessor and controller 110. Similarly, buffer 231 is connected between interrupt controller 120 and interrupt controllers 111 through 118, to flip-flop 204 and between the microprocessor and interrupt controller 120.

Flip-flops 201 through 204 are implemented with an integrated circuit part number 7474 manufactured by Signetics Incorporated. Buffers 230 and 231 are implemented by means of an integrated circuit part number 74LS244 and such circuits are manufactured by Texas Instruments Corporation.

In order to facilitate an understanding of the operation of this circuit an example is presented. Referring to FIG. 2, when an interrupt request signal is presented on the INTR1 lead by interrupt controller 110, flip-flop 201 is set with outputs Q and $\overline{Q}$ being logic "1" and logic "0" respectively. This action occurs on the next cycle of the clock circuit 205 which is connected to the clock CLK input of each of the flip-flops 201 through 204. Clock circuit 205 is a crystal control last letter with a frequency of 1 MHZ. In response to flip-flop 201 being set, flip-flop 202 is also set. As a result, the interrupt request signal is transmitted through NOR gate 221 to the microprocessor. In addition, the $\overline{Q}$ output of flip-flop 202 is transmitted to AND gate 211, through AND gate 212 to the CLR input of flip-flop 203. Thereby, flip-flop 203 is inhibited from operation in response to an interrupt request signal transmitted through interrupt controller 120.

When microprocessor responds with an interrupt acknowledge signal INTA, it is transmitted through buffer 230 to interrupt controller 110. The $\overline{Q}$ signal of flip-flop 202 was transmitted to buffer 230 to the enable input in order that all input signals be transmitted through buffer 230. In addition, all cascade signals 1 MCS0-3 which were transmitted from interrupt controller 110 to the interrupt expander circuit 200 are transmitted through buffer 230 in a 3-line bus arrangement to each of the interrupt controllers 101 through 108. Buffer 230 provides additional drive for each of the signals transmitted through it. The appropriate interrupt controller 101 through 108 now operates to "jam" and interrupt address on the data bus in order for the microprocessor to service the particular interrupt source. When the interrupt has been serviced, all interrupt controllers are reset and flip-flops 201 and 202 also reset. The inhibit is removed from flip-flop 203 and subsequent interrupts may now be processed.

When an interrupt request is transmitted via the INTR2 lead initially, circuit operation of flip-flops 203 and 204 is similarly to that described above for flip-flops 201 and 202. In addition, the $\overline{Q}$ output of flip-flop 204 is transmitted via AND gate 220 to the CLR input of flip-flop 201, thereby, inhibiting flip-flop 201 from operation. An interrupt request signal is transmitted through NOR gate 221 to the microprocessor. When the microprocessor responds with an interrupt acknowledge via the INTA lead, buffer 231 is now enabled and the interrupt acknowledge along with the 3-bit cascade signal bus to MCS0-2 is transmitted through buffer 231 to interrupt controllers 111 through 118. The interrupt acknowledge signal INTA2 is transmitted to interrupt controller 120. Servicing of the interrupt source proceeds similarly to that described above.

When simultaneous interrupts are transmitted to the interrupt expander circuit via INTR1 and INTR2 leads, both flip-flops 201 and 203 operate producing logic "0" signals on the $\overline{Q}$ outputs. These outputs are transmitted to OR gate 210 producing a subsequent signal transmitted from gate 210 through AND gates 211 and 212, thereby producing a logic "0" signal transmitted to the CLR input of flip-flop 203. As a result, flip-flop 203 is inhibited from operation and flip-flop 204 is not set in response. However, the Q output signal of flip-flop 201 is transmitted to flip-flop 202 and flip-flop 202 is set in response. Thereby, an interrupt request signal is transmitted via NOR gate 221 to the microprocessor. When the microprocessor responds with the interrupt acknowledge signal on the INTA lead, it is process similarly to that described above for an interrupt request signal on the INTR1 lead.

When the interrupt source has been serviced, flip-flop 201 is reset thereby removing the logic "0" signal from the CLR input of flip-flop 203. Flip-flop 203 is now allowed to transmit the interrupt request signal on lead INTR2 to flip-flop 204 which is set in response and transmits the interrupt request signal through NOR gate 221 to the microprocessor as described above.

In this scheme, when simultaneous interrupts occur the interrupt source connected to interrupt controller 110 is serviced first, but before any subsequent interrupts from interrupt controller 110 are serviced the interrupt presented by interrupt controller 120 will be serviced. In this manner, the interrupt requests are processed on an alternate basis.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. An interrupt expander circuit for use in a microprocessor system, said interrupt expander circuit connected between a microprocessor central processing unit and first and second interrupt controllers, said first interrupt controller connected to a first plurality of interrupt controllers and said second interrupt controller connected to a second plurality of interrupt controllers, each of said interrupt controllers operable to transmit an interrupt request signal, said first and said second pluralities of interrupt controllers connected respectively to first and second pluralities of interrupt sources each of said sources operable to generate an interrupt request signal, said interrupt expander circuit comprising:

a clock circuit operable to generate periodic pulses of a predetermined frequency;

first latching means connected between said first interrupt controller and said microprocessor and connected to said clock circuit, said first latching means operated in response to said interrupt request signal of said first interrupt controller to produce a first output signal for transmission to said microprocessor indicating the detection of an interrupt request and further operated to produce a second output signal;

second latching means connected between said microprocessor and said second interrupt controller and connected to said clock circuit, said second latching means operated in response to said interrupt request signal of said second interrupt controller to produce a first output signal for transmission to said microprocessor indicating the detection of an interrupt request from said second plurality of interrupt sources and further operated to produce a second output signal;

first gating means for inhibiting the operation of said second latching means, said first gating means connected between said first latching means and said second latching means, whereby in response to simultaneous interrupt request from said first and second interrupt controllers a third output signal is generated to inhibit said operation of said second latching means and said third output signal is further produced in response to said second output signal of said first latching means;

second gating means for inhibiting said operation of said first latching means, said second gating means connected between said first and said second latching means and operated in response to said second output signal of said second latching means to provide a fourth output signal for inhibiting said operation of said first latching means;

said interrupt expander circuit further includes means operated in response to an interrupt acknowledge signal from said microprocessor to provide a fifth output signal for transmission to said first interrupt controller and alternatively to provide for transmission of said fifth output signal to said second interrupt controller;

said first interrupt controller operated in response to said fifth output signal to operate one of said plurality of interrupt controllers and alternatively said second interrupt controller operated in response to said fifth output signal to operate one of said second plurality of interrupt controllers, whereby when simultaneous interrupts occur the interrupt source connected to said first interrupt controller is serviced first but before any subsequent interrupts from said first interrupt controller are serviced the interrupt presented by said second interrupt controller will be serviced.

2. An interrupt expander circuit as claimed in claim 1, wherein there is further included:

means for buffering connected to said first and said second latching means and operated to provide buffering in response to said second output signal of said first latching means and alternatively operated to provide buffering in response to said second output signal of said second latching means.

3. An interrupt expander circuit as claimed in claim 2, wherein: said means for buffering is further connected between said microprocessor, said first and said second interrupt controllers and said first and said second pluralities of interrupt controllers and said means for buffering operated to provide buffering for the transmission of said fifth signal and for transmission of a plurality of cascade control signals transmitted from said first interrupt controller to each of said plurality of first interrupt controllers and from said second interrupt controller to each of said plurality of second interrupt controllers.

4. An interrupt expander circuit as claimed in claim 1, wherein: each of said latching means includes first and second D-type edge triggered flip-flops.

5. An interrupt expander circuit as claimed in claim 4, wherein: said first flip-flop of said first latching means is connected between said first interrupt controller and said second flip-flop of said first latching means and said second flip-flop of said first latching means is connected between said first flip-flop and said microprocessor whereby said interrupt request of said first interrupt controller is transmitted through said first and said second flip-flops to said microprocessor.

6. An interrupt expander circuit as claimed in claim 4, wherein: said first flip-flop of said second latching means is connected between said second interrupt controller and said second flip-flop of said second latching means and said second flip-flop of said second latching means is connected between said first flip-flop and said microprocessor whereby said interrupt request signal of said second interrupt controller is transmitted through said first and said second flip-flops to said microprocessor.

7. An interrupt expander circuit as claimed in claim 4, wherein there is further included: an OR gate connected between said second flip-flops of said first and said second latching means and said microprocessor.

8. An interrupt expander circuit as claimed in claim 4, wherein: said first gating means includes an OR gate connected to said first flip-flops of each of said latching means;

an AND gate connected to said OR gate and to said second flip-flop of said first latching means; and
a second AND gate connected between said first AND gate and said first flip-flop of said second latching means.

9. An interrupt expander circuit as claimed in claim 4, wherein:

said second gating means includes an AND gate connected between said second flip-flop of said second latching means and said first flip-flop of said first latching means.

* * * * *

UNITED STATES PATENT AND TRADEMARK OFFICE
CERTIFICATE OF CORRECTION

PATENT NO. : 4,275,458
DATED : June 23, 1981
INVENTOR(S) : M. Ibrahim Khera

It is certified that error appears in the above-identified patent and that said Letters Patent are hereby corrected as shown below:

Column 7, line 36, change "request" to --requests--.

Column 7, line 57, before "plurality" insert --first--.

Signed and Sealed this

Thirteenth Day of October 1981

[SEAL]

*Attest:*

*Attesting Officer*

GERALD J. MOSSINGHOFF
*Commissioner of Patents and Trademarks*